UNITED STATES PATENT OFFICE.

RICHARD BAYNES AND JOHN FEARENSIDE, JR., OF LIVERPOOL, COUNTY OF LANCASTER, ENGLAND.

PROCESS OF PURIFYING OR REFINING PETROLEUM AND OTHER DISTILLABLE OILS.

SPECIFICATION forming part of Letters Patent No. 299,324, dated May 27, 1884.

Application filed November 14, 1883. (No specimens.)

*To all whom it may concern:*

Be it known that we, RICHARD BAYNES and JOHN FEARENSIDE, Jr., both of Liverpool, in the county of Lancaster, in the Kingdom of England, have invented certain new and useful Improvements in the Process of Purifying or Refining Petroleum and other Distillable Oils, of which the following is a specification.

Mineral and other oils of a distillable nature—such as rosin-oil—are often of a very dark, nearly black, color. This color is usually extracted or destroyed by the use of alkalies or acids, or both consecutively. Now, in place of this we take powdered charcoal or other absorbent not liable to be decomposed, dissolved, melted, or altered in composition by the oil, in so far as it is altered by absorbing the coloring-matter, and mix it with the crude oil to the consistency of mud. We then distill the oil off, and we find that nearly all the coloring-matter remains in the powder. The powder can be used for a fresh operation. We have already tried as absorbing-powders wood-charcoal, coke, bone-ash, fuller's-earth, china-clay, and alumina earths, both burned and unburned, and have found all to answer, more or less; but that with ordinary metallurgical coke or wood charcoal steeped in a saturated solution of chloride of zinc and well dried we have the best effects. We find that the material, whatever it be, must be absolutely dry. The form of still is almost immaterial, as the oil seems to pass through the porous material to the sides of the still by capillary attraction, and distill off without any necessity for stirring mechanism, and that the coke or charcoal used at the end of the operation is granular or pulverulent and ready to be used for mixing with more oil for a fresh operation.

The object of impregnating the charcoal with chloride of zinc is to deprive the oil of its sulphur compounds and other like matters, while at the same time the color is exhausted therefrom. It is obvious, however, that instead of impregnating the charcoal with it the two substances can be used separately. We find also that other soluble salts of zinc—such as the sulphate—and also similar soluble salts of iron and of several other metals will answer. In fact, almost any salt having a base with greater affinity for sulphur than for the acid in combination with that base will accomplish the purpose.

The plan we have set forth in the specification of impregnating charcoal or coke with anhydrous chloride of zinc we find superior to and more economical than any other.

We are aware of the United States Patent to Webster, No. 94,532, September 7, 1869, but lay no claim to the process therein described. We are also aware that it is not new to bleach dark-colored oils by filtering them through powdered charcoal; but

What we claim as our invention is—

The process of bleaching and purifying dark-colored distillable oils, which consists in adding to the oil pulverized dry coke or charcoal impregnated with anhydrous chloride of zinc, such as described, till it arrives at the consistency of mud, subjecting it to distillation, and then condensing the distillate, substantially as described.

In testimony whereof we have signed our names to this specification in the presence of two subscribing witnesses.

RICHARD BAYNES.
JNO. FEARENSIDE, JR.

Witnesses:
JAMES W. ALSOP,
JOHN HAYS.